(12) United States Patent
Tsuyuki

(10) Patent No.: US 8,712,668 B2
(45) Date of Patent: Apr. 29, 2014

(54) CONTROL SYSTEM FOR AN INTERNAL COMBUSTION ENGINE

(75) Inventor: Takeshi Tsuyuki, Hadano (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 239 days.

(21) Appl. No.: 13/407,112

(22) Filed: Feb. 28, 2012

(65) Prior Publication Data

US 2012/0316756 A1 Dec. 13, 2012

(30) Foreign Application Priority Data

Jun. 7, 2011 (JP) .................................. 2011-127238

(51) Int. Cl.
*F02D 41/00* (2006.01)
*F02D 21/10* (2006.01)

(52) U.S. Cl.
USPC ..................................... 701/103; 123/568.14

(58) Field of Classification Search
USPC .......... 701/103, 104, 108, 110; 123/434, 435, 123/568.14, 90.15; 73/114.32, 114.33, 73/114.37
See application file for complete search history.

(56) References Cited

U.S. PATENT DOCUMENTS

| 7,021,298 B2 * | 4/2006 | Nakazawa et al. ........ 123/568.14 |
| 2005/0229909 A1* | 10/2005 | Nakazawa et al. ........ 123/568.14 |
| 2008/0077304 A1* | 3/2008 | Suzuki et al. .................. 701/102 |

FOREIGN PATENT DOCUMENTS

| JP | 2006-194112 | | 7/2006 |
| JP | 2006177193 A | * | 7/2006 |
| JP | 2007-263082 | | 10/2007 |
| JP | 2007-263083 | | 10/2007 |

* cited by examiner

*Primary Examiner* — Mahmoud Gimie
(74) *Attorney, Agent, or Firm* — Drinker Biddle & Reath LLP

(57) ABSTRACT

A control system for a direct-injection four-stroke internal combustion engine having at least one cylinder, an intake passage supplying air to the cylinder, and an exhaust passage removing exhaust gas from the cylinder, the control system including a mass air flow meter configured to detect a mass air flow upstream of the cylinder and a control unit. The control unit is configured to detect an intake air density in the cylinder, calculate an in-cylinder trapped intake air amount based on a cylinder volume and the detected intake air density, and estimate a difference between the intake air amount detected by the mass air flow meter and the in-cylinder trapped intake air amount, the estimated difference being an estimated scavenging amount representing a fresh air blowby amount passing from the intake passage into the exhaust passage.

15 Claims, 6 Drawing Sheets

CONTROL SYSTEM FOR AN INTERNAL COMBUSTION ENGINE

CROSS-REFERENCE TO RELATED APPLICATIONS

This application claims priority under 35 U.S.C. §119 to Japanese Patent Application No. 2011-127238, filed on Jun. 7, 2011, which is incorporated by reference herein in its entirety.

BACKGROUND OF THE INVENTION

1. Field of Invention

The present invention generally relates to a control system for an internal combustion engine in which a fresh air blowby amount passing from an intake passage through to an exhaust passage may be estimated based on a measurement of an intake air amount in the intake passage.

2. Description of Related Art

A conventional technology for reducing a residual gas amount within in a cylinder is to make effective use of a scavenging effect due to valve overlap, in which an amount of valve overlap is controlled according to an estimated amount of fresh air blowby which passes from an intake passage into an exhaust passage. The fresh air blow-by is estimated based on an oxygen concentration detected by an air-fuel ratio sensor disposed in the exhaust passage.

In conventional systems, however, when estimating the fresh air blowby from an intake passage into an exhaust passage based on the oxygen concentration in the exhaust passage, the oxygen concentration may vary according to the fuel injection amount. In addition the oxygen concentration may be subject to a so-called after-burn phenomenon which takes place in the exhaust passage with a fuel-rich exhaust gas reacting with blowby air. Therefore, there remains a problem of not always being able to estimate the amount of fresh air blowby with sufficient accuracy. Note that the fresh air blowby amount may alternatively be referred to below as a scavenging amount.

SUMMARY OF THE INVENTION

Described herein is an internal combustion engine which can estimate with accuracy the amount of fresh air blowby. An in-cylinder air mass is calculated by multiplying a cylinder volume by an in-cylinder intake air density. An in-cylinder trapped intake air amount is calculated by using the in-cylinder air mass, the engine rotation speed, and the number of intake cylinder per revolution. By subtracting from the intake air amount detected by an air flow meter the in-cylinder intake air trapped amount, an estimated scavenging amount can be obtained.

Hence, one aspect of the present invention resides in that in an internal combustion engine, the fresh air blowby amount from the intake passage into the exhaust passage is estimated to correspond to a difference between the intake air amount detected by a mass flow detecting means and the amount of in-cylinder trapped intake air calculated based on both a cylinder volume and intake density within the cylinder.

According to the present invention, the fresh air blowby into the exhaust passage may be, though indirectly, measured by an actual measurement of mass flow detecting means, and a fresh air blowby amount will be estimated without being influenced by the fuel injection amount and/or the after-burn of the exhaust mixture within the exhaust passage.

In one embodiment, a control system is described for a direct-injection four-stroke internal combustion engine having at least one cylinder, an intake passage supplying air to the cylinder, and an exhaust passage removing exhaust gas from the cylinder. The control system includes a mass air flow meter configured to detect a mass air flow upstream of the cylinder and a control unit. The control unit is configured to detect an intake air density in the cylinder, calculate an in-cylinder trapped intake air amount based on a cylinder volume and the detected intake air density, and estimate a difference between the intake air amount detected by the mass air flow meter and the in-cylinder trapped intake air amount, the estimated difference being an estimated scavenging amount representing a fresh air blowby amount passing from the intake passage into the exhaust passage.

In another embodiment, a method is described for controlling a direct-injection four-stroke internal combustion engine having at least one cylinder, an intake passage supplying air to the cylinder, and an exhaust passage removing exhaust gas from the cylinder. The method includes detecting a mass air flow upstream of the cylinder, detecting an intake air density in the cylinder, calculating an in-cylinder trapped intake air amount based on a cylinder volume and the detected intake air density, and estimating a difference between the intake air amount detected by the mass air flow meter and the in-cylinder trapped intake air amount, the estimated difference being an estimated scavenging amount representing a fresh air blowby amount passing from the intake passage into the exhaust passage.

In another embodiment, a control system is described for an internal combustion engine. The control system includes an in-cylinder intake air density detecting means configured to detect an intake air density in a cylinder, an in-cylinder intake air trapped amount calculating means configured to calculate an in-cylinder trapped intake air amount based on a cylinder volume and the intake air density, a mass air flow meter configured to detect a mass air flow upstream of the cylinder, and an estimated scavenging amount calculating means configured to estimate a difference between the intake air amount detected by the mass air flow sensor and the in-cylinder trapped intake air amount as an estimated scavenging amount representing a fresh air blowby amount passing from an intake passage into an exhaust passage.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

In the following, an explanation of an embodiment according to the present invention will be made with reference to accompanying drawings.

Figure 1:
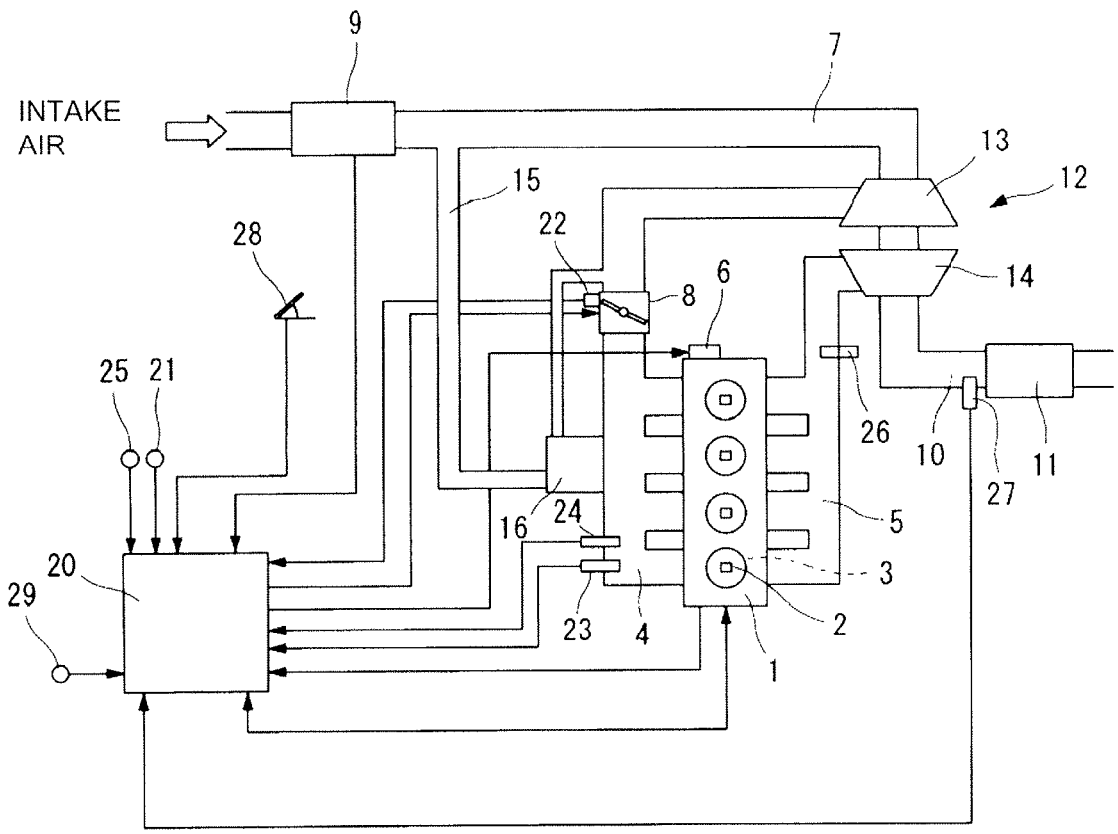
FIG. 1 is an overall view showing schematically an internal combustion engine to which is an embodiment of the present invention is applied.

FIG. 1 is a overall view showing schematically an in-line four-cylinder, 4-stroke, internal combustion engine to which the present invention is applied. The internal combustion engine 1 is of an in-cylinder direct injection type in which fuel is directly injected into a combustion chamber defined by a cylinder 3. Each cylinder 3 is connected to an intake manifold 4 via intake valve and intake port (both not illustrated). Each cylinder 3 is further connected to an exhaust manifold 5 via exhaust valve and exhaust port (both not illustrated). Both the intake port and exhaust port are disposed in a cylinder head of each cylinder 3 so as to oppose to each other.

In the present embodiment, a variable valve mechanism 6 is employed as an intake valve driving mechanism and a valve lift characteristic of the intake valve is subject to be changed. The variable valve mechanism 6 is, as generally known, a phase variable mechanism for a valve timing control (VTC) which changes a phase of camshaft (not shown) relative to a crankshaft (not shown), and is disposed in an end of intake camshaft (not shown) to selectively open and close an intake valve. By changing a relative angle or transform angle of the intake camshaft relative to the crankshaft, both an open timing and a close timing of intake valve can be changed. It should be noted that another variable valve mechanism may be used in which a close timing of intake valve (IVC) may be altered. Also, a valve mechanism to change an operative angle of an intake valve may equally be used, for example. Moreover, a similar variable valve mechanism may be employed for an exhaust valve so that both valve timings for intake and exhaust valves are under variable control.

In an intake passage 7 connected to the intake manifold 4 includes a throttle valve 8. Upstream of the throttle valve 8 is an air flow meter 9 which functions as a mass flow rate detecting means. The air flow meter 9 may be a hot-wire anemometer, for example, and houses a temperature sensor to detect an intake air temperature for accurate measurements of intake air mass flow.

An exhaust passage 10 connected to the exhaust manifold 5 is provided with an exhaust catalyst 11 such as a three-way catalyst for exhaust gas purification. In addition, the internal combustion engine 10 is provided with a turbo charger 12 having a compressor 13 disposed in the intake passage 7 and a turbine 14 disposed in the exhaust passage 10 and co-axially mounted with the compressor. The compressor 13 is positioned upstream of the throttle valve 8 and downstream of the air flow meter 9. The turbine 14 is located downstream of the exhaust manifold 5 and upstream of the exhaust catalyst 11.

A recirculation passage 15 is connected to the intake passage 7. Specifically, an end of the recirculation passage 15 is connected to the intake passage 7 at a location which is downstream of air flow meter 9 and upstream of compressor 13, while the other end is connected to the intake passage 7 a location which is downstream of compressor 13 and upstream of throttle valve 8.

In the recirculation passage 15 is interposed a recirculation valve 16 which is configured to open when a difference pressure between an intake pressure at the upstream side of throttle valve 8 and that within intake manifold 4 exceeds a predetermined value.

In the intake passage 7, an intercooler (not shown) is disposed at downstream of compressor 13. The intercooler is positioned upstream of the position at which the other end of recirculation passage 15 is connected.

In addition to a detection signal of the air flow meter 9, other various signals are introduced to a control unit 20, such as from a crank angle sensor 21 which detects a crank angle of the crankshaft, a throttle sensor 22 which detects an openness of the throttle valve 8, an intake pressure sensor 23 which detects an intake pressure within the intake manifold 4, an intake temperature sensor 24 which detects an intake air temperature within the intake manifold 4, an intake cam angle sensor 25 which detects a phase (transform angle) of an intake cam shaft with respect to the open/close timings of intake valve, an exhaust temperature sensor 26 which detects the exhaust temperature upstream of the turbine 14, an air-fuel ration sensor 27 which detects an oxygen concentration upstream of the exhaust catalyst 11 in the exhaust passage 10, an accelerator opening sensor 28 which detects an accelerator pedal stroke, an atmosphere pressure sensor 29 which detects an tropospheric or ambient atmospheric pressure, and the like.

The control unit 20 in turn executes various controls on the internal combustion engine 1 such as ignition timing, valve timing, and air-fuel ratio based on the above described detection signals. In parallel, during an engine operating state of intake/exhaust valve overlap, during which both the intake valve and the exhaust valves are open, by estimating a fresh air blowby passing through from the intake passage 7 to the exhaust passage 10, an adjustment will be made on the fuel injection amount which is calculated based on the intake air amount detected by the air flow meter 9.

During a valve overlap period, since a part of the intake air which has been detected by the air flow meter 9 will escape into the exhaust passage 10 as a fresh air blowby, an excessive amount of fuel will be injected and a negative influence of after-burn of residual fuel will be experienced in the exhaust passage unless an appropriate adjustment is made on the fuel injection amount considering the fresh air blowby amount.

Based on a relationship between the intake pressure and the valve overlap, an estimate of fresh air blowby will be possible for both a transient operation and a steady operation of the engine. Therefore, the amount of fresh air blowby can be estimated by using the intake pressure, the engine rotation speed, and the valve overlap, as well as other relevant parameters. However, in the situations of malfunction of the intake pressure sensor 23 which detects the intake pressure, or of the intake cam angle sensor 25 which detects the transform angle for use in calculation of valve overlap amount that cause the detected value of these sensors to deviate from the actual value, an accurate estimate of the fresh air blowby amount becomes difficult.

In order to estimate a fresh air blowby amount, a separate arrangement is provided from a basic scavenging amount which is derived based on intake pressure, engine speed, valve overlap, and the like. The separate estimate is made on the fresh air blowby amount utilizing the intake air amount detected by the air flow meter 9. In a steady state of engine operation, a comparison is made between this fresh air estimate and the basic scavenging amount for a determination of system failure.

Note that the amount of intake air detected by the air flow meter 9 may not correctly represent an actual amount of air flow due to a response delay in a transient state. Therefore, the detection signal on the amount of intake air is preferably used only for a scavenging amount estimate during a steady state.

Figure 2:
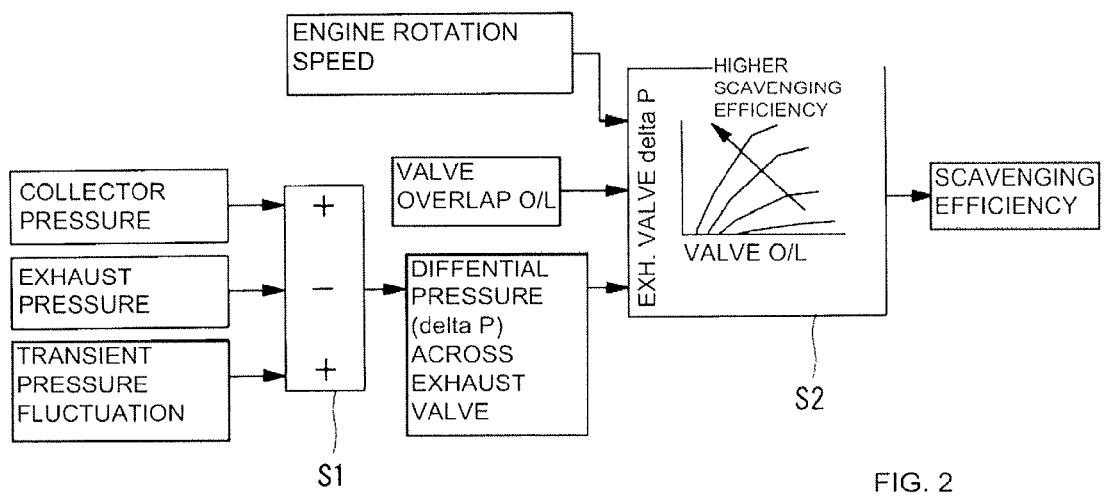
FIG. 2 is a block diagram explaining an arithmetic operation to obtain a scavenging ratio for use in calculating a basic scavenging or blowby amount.

FIG. 2 is a block diagram explaining an arithmetic operation to obtain a scavenging ratio. In block S1, a difference pressure across the exhaust valve is calculated by subtracting the exhaust pressure from a collector pressure. During a steady state, a calculation of fluctuation in transient exhaust pressure is not needed.

The collector pressure is assumed to be the intake pressure within the intake manifold 4 detected by the intake pressure sensor 23. The exhaust pressure may be obtained for example by using a detection value of the exhaust temperature sensor 26 and that of the air flow meter 9. A transient exhaust pressure fluctuation is a fluctuation amount in the exhaust pressure during a transient operation period, and may be calculated based on the signals from the air flow meter 9 and the throttle sensor 22.

In block S2, based on the engine rotation speed, the valve overlap amount, and the differential pressure across the exhaust valve, and referring to a predefined map, a scavenging ratio will be obtained. The basic scavenging amount is computed by multiplying the scavenging ratio calculated in block S2 by a detection value of the air flow meter 9.

The engine rotation speed is calculated based on a detection value of the crank angle sensor 21. The amount of valve overlap is the value which is determined based on an upper limit scavenging amount, which in turn is derived from the operation conditions of engine (intake pressure, engine rotation, fuel injection amount, etc.). Considering the specifications of the engine 1 and by previously defining a relationship with respect to the upper limit of the scavenging amount, the valve overlap amount may be defined.

The map which is utilized in block S2 is defined by a two dimensional map as shown in FIG. 2 with the differential pressure across exhaust valve represented on the vertical axis while the valve overlap amount represented in the horizontal axis. The control unit 20 prepares and stores a plurality of these maps depending on the engine rotation speed.

Figure 3:
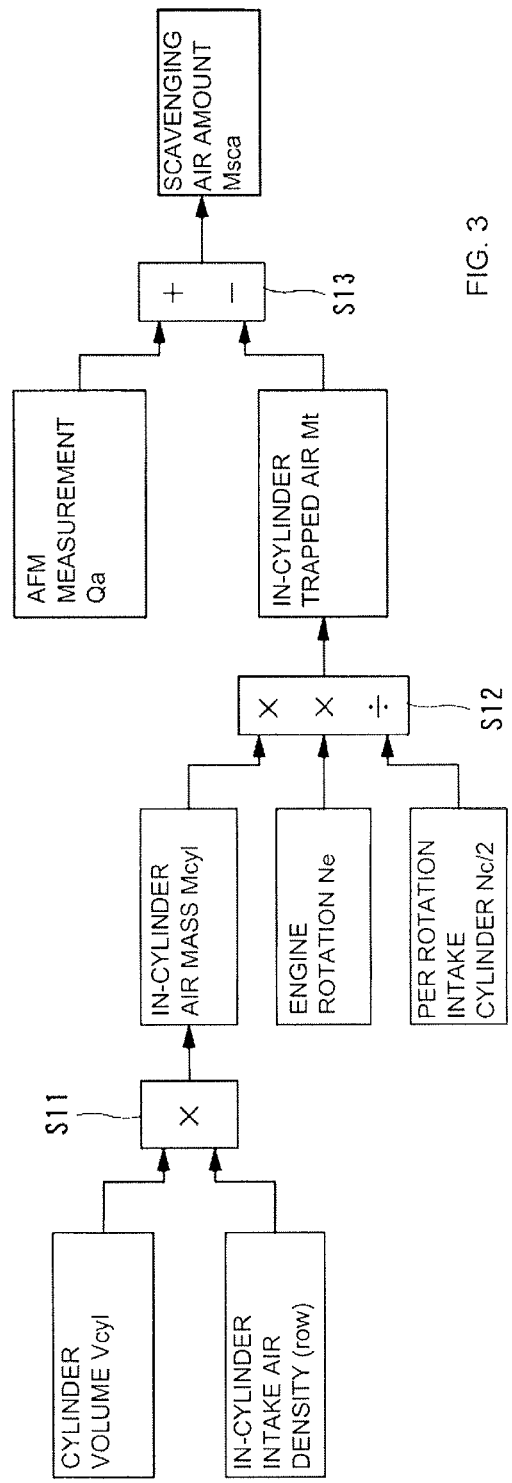
FIG. 3 is a block diagram showing an arithmetic operation for estimating scavenging amount.

FIG. 3 is a block diagram showing an arithmetic operation for an estimate of scavenging amount as a difference between the air amount passing through the air flow meter 9 and the air amount remained or trapped within a cylinder 3 for combustion.

In block S11, an amount of in-cylinder air mass Mcyl is obtained by multiplying a cylinder volume Vcyl by an in-cylinder air density $\rho$. The cylinder volume indicates an effective cylinder volume into which air will be introduced that effectively contributes to combustion within a cylinder 3 during engine operation. This effective cylinder volume may be obtained by subtracting an in-cylinder residual gas amount (i.e., internal EGR) estimated by the intake/exhaust valve overlap amount (period), the engine rotation speed, and other parameters from the cylinder volume at the timing of intake valve closure. The in-cylinder intake air density is calculated based on the detection values of the intake pressure sensor 23 and the intake temperature sensor 24.

In block S12, the amount of in-cylinder air mass Mcyl calculated in block S11 is multiplied by the engine rotation speed Ne, and further divided by the per rotation number of intake cylinders (Nc/2), wherein Nc denotes the number of cylinders of the four-cycle engine. The result of block S12 is an amount of in-cylinder trapped air mass per second Mt, which represents the amount of air remaining in a cylinder 3 to contribute to combustion.

In block S13, an estimated scavenging air amount Msca is obtained by subtracting from the intake air amount Qa detected by the air flow meter 9 the in-cylinder trapped intake air amount Mt. When no fresh air blowby is present from the intake passage 7 into the exhaust passage 10, the intake air amount Qa detected by the air flow meter 9 is the same value as the in-cylinder trapped intake air amount Mt.

As illustrated in FIG. 3, by calculating a scavenging amount Msca, a fresh air blowby amount into the exhaust passage 10 may be obtained, indirectly, based on an intake amount that is detected by the air flow meter 9. The estimate of the scavenging amount Msca is not influenced by factors such as the fuel injection quantity and/or after-burn in the exhaust gas. Note that, since the influence of residual gas becomes smaller as the amount of fresh air blowby increases, the estimate precision of the scavenging amount improves as the intake air amount increases. In addition, by considering a residual gas remaining within a cylinder and employing the effective cylinder volume, the fresh air blowby may be even more accurately estimated. Therefore, by making use of both the basic scavenging amount and estimated scavenging amount thus calculated, in a steady state of the engine, a system failure may be detected as explained below with reference to FIG. 4.

In block S21, a difference between the estimated scavenging amount and the basic scavenging amount is calculated. In block S22, the absolute value of the value calculated in block S21 is obtained. In block S23, a determination is made as to whether or not the absolute value of the difference between the estimate scavenging amount and the basic scavenging amount obtained in block S22 exceeds a predetermined value A. In block S24, a system failure is determined and when the absolute value exceeds the predetermined value A, indicating an abnormality in the basic scavenging amount. On the other hand, when the absolute value of difference between the estimated scavenging amount and basic scavenging amount is smaller than the predetermined value A, the basic scavenging amount is confirmed to be normal.

Therefore, by recognizing a deviation between the estimated scavenging amount and the basic scavenging amount, abnormality in the value of the basic scavenging amount may be detected before the operation of the internal combustion engine 1 is adversely affected.

Figure 4:
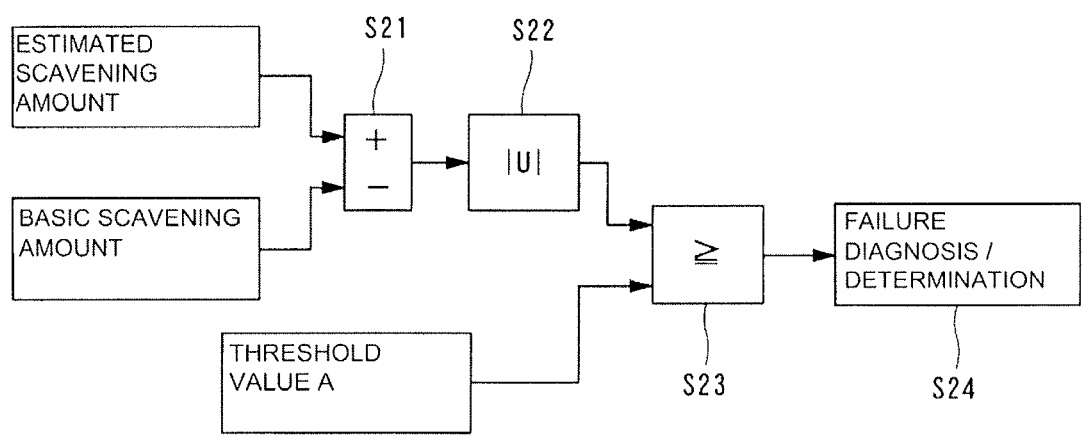
FIG. 4 is a block diagram showing an arithmetic operation for determination of system failure.
Figure 5:
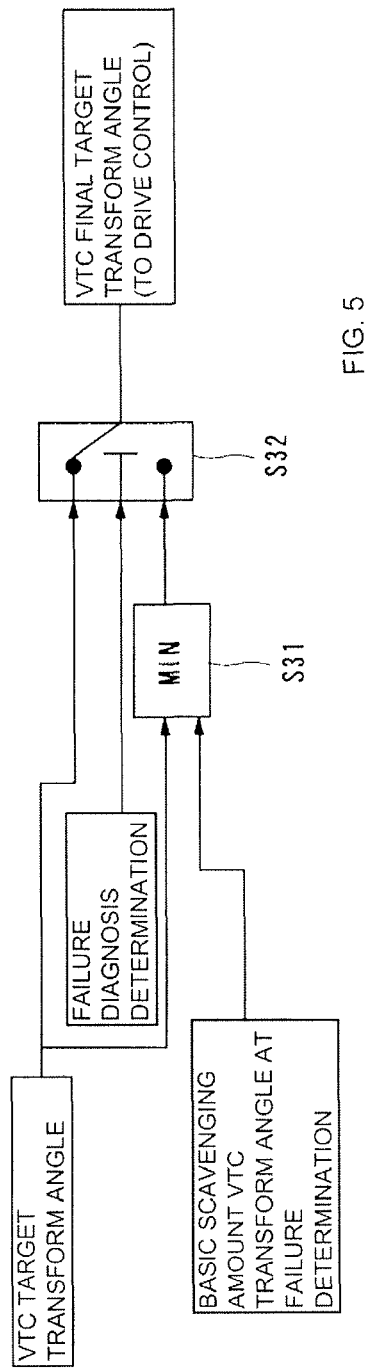
FIG. 5 is a block diagram showing an arithmetic operation for determination of a target transform angle.

FIG. 5 is a block diagram showing an arithmetic operation for the target transform angle of the variable valve mechanism 6 which is subject to change according to the system failure determination shown in FIG. 4.

Following a system failure determination, a thus and indication of abnormality in the basic scavenging amount, when the amount of fresh air blowby passing from the intake passage 7 to the exhaust passage 10 is higher than the calculated basic scavenging amount, an excessive amount of fuel might be injected, causing after-burn of residual fuel, which affect adversely the exhaust catalyst 11.

Therefore, if it is determined that the basic scavenging amount is abnormal, a target transform angle stemming from the torque demand to the internal combustion engine will be compared with the maximum transform angle of the intake cam shaft at which exhaust catalyst 11 may not be adversely affected, and a smaller value (i.e., in the direction of smaller valve overlap) is selected as a final target transform angle. In other words, when an abnormality in the basic scavenging amount is determined, the valve timing of the intake valve us controlled by the variable valve mechanism 6 in such a way that the intake/exhaust valve overlap period will not exceed a predetermined period.

In block S31, a VTC target transform angle, defined as a target transform angle of the variable valve mechanism 6 and determined based on operative conditions of the engine 1, is compared with the basic VTC transform angle corresponding to the abnormal basic scavenging amount. The basic VTC transform angle is a maximum permissible value in case of an abnormality determination in the basic scavenging amount. The smaller of the target transform angle and the basic VTC transform angle is output to block S32.

Block S32 is furnished with the target transform angle of variable valve mechanism 6 determined by operative conditions (or torque demand) on the engine 1, a result signal of the system failure determination, and the information from block S31. Based upon the system failure determination, when it is determined that there is no abnormality in the basic scavenging amount, the target transform angle determined by the engine operating conditions is out put as a VTC final target transform angle, while, when an abnormality in the basic scavenging amount is determined, the value output from block S31 will be provided as the VTC final target transform angle.

By this arrangement, when the estimated scavenging amount deviates from the basic scavenging amount, the valve overlap is restricted, and to allow the influence on the exhaust system within a permissible level, the transform angle of the intake cam shaft of the variable valve mechanism 6 is restricted to maintain the fresh air blowby from the intake passage 7 into the exhaust passage 10 at a small amount.

In addition, as a result of the system failure determination, even if the deviation of the basic scavenging amount from the estimated scavenging amount is not large enough to determine abnormality, when the deviation of the estimated scavenging amount from the basic scavenging amount is more than a predetermined value, the air-fuel ratio of the internal combustion engine 1 will be adjusted.

Figure 6:
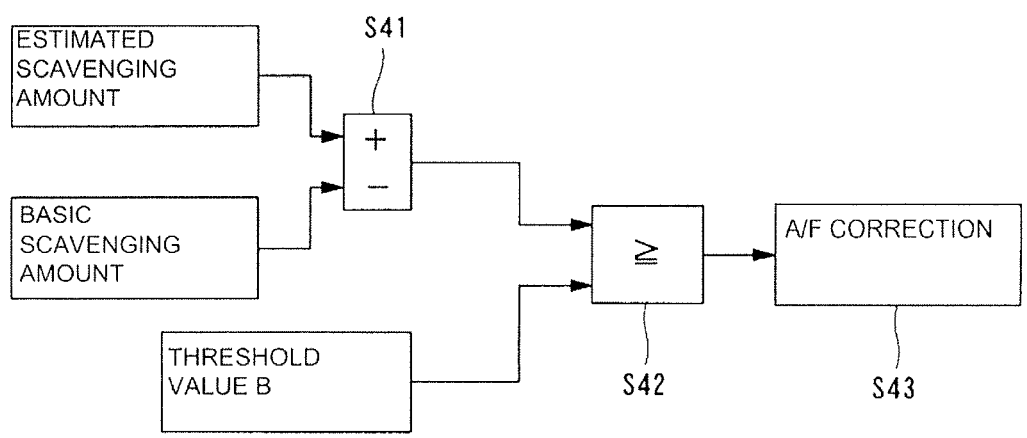
FIG. 6 is a block diagram showing an arithmetic operation for determination of compensation or adjustment of the air-fuel ratio.

FIG. 6 is a block diagram showing an arithmetic operation for compensation or adjustment of the air-fuel ratio when the basic scavenging amount deviates by more than the predetermined value.

In block S41, a difference between the estimated scavenging amount and the basic scavenging amount is calculated. In subsequent block S42, a determination is made as to whether the difference obtained in block S41 exceeds a predetermined value B.

Subsequently in block S43, an air-fuel ratio of the engine 1 is adjusted. More specifically, when in block S42 it is determined that the difference between the estimated scavenging amount and the basic scavenging amount exceeds the predetermined value B, then air-fuel ratio is adjusted in the lean direction to reduce the fuel injection amount. On the other hand, when the difference between the estimated scavenging amount and the basic scavenging amount is smaller than the predetermined value B, no adjustment in the air-fuel ratio is made because there is no need reduce the fuel injection amount.

The adjustment of the air-fuel ratio performed in block S43 is specifically made to shift the target air-fuel ratio in the lean direction when the air-fuel ratio is under feedback control. Whereas, when the air-fuel ratio is under a feed forward control, a feed forward target will be set in the lean direction.

When the estimated scavenging amount is greater than the basic scavenging amount, the amount of reduction of fuel with respect to the basic scavenging amount would be insufficient without the air-fuel correction. An excessive amount of fuel injected would react with the fresh air blowby into the exhaust passage 10 and combust, which would cause a system failure such as an abnormal temperature rise or fusion of the exhaust catalyst 11. By comparison, when the estimated scavenging amount exceeds the basic scavenging amount by more than the predetermined value B, the amount of injection fuel is corrected according to the estimated scavenging amount so that a temperature increase in the exhaust catalyst 11 may be suppressed.

Note the predetermined value B is defined to be smaller than the predetermined value A which is used in a system failure determination as shown in FIG. 4. In other words, when the estimated scavenging amount deviates from the basic scavenging amount, the transform angle of the intake cam shaft of the variable valve mechanism 6 will be restricted to reduce fresh air blowby from the intake passage 7 to the exhaust passage 10, thereby protecting the exhaust catalyst 11. When the deviation of the estimated scavenging amount from the basic scavenging amount is small, the air-fuel ratio will be corrected to be in a lean direction with a reduction in a fuel injection amount to suppress a temperature increase of exhaust catalyst 11.

Alternatively, a deviation between the estimated scavenging amount and the basic scavenging amount may be memorized and stored in the control unit 20 for corrective use of control amounts such as a fuel injection amount, which are affected by the amount of fresh air blowby.

Figure 7:
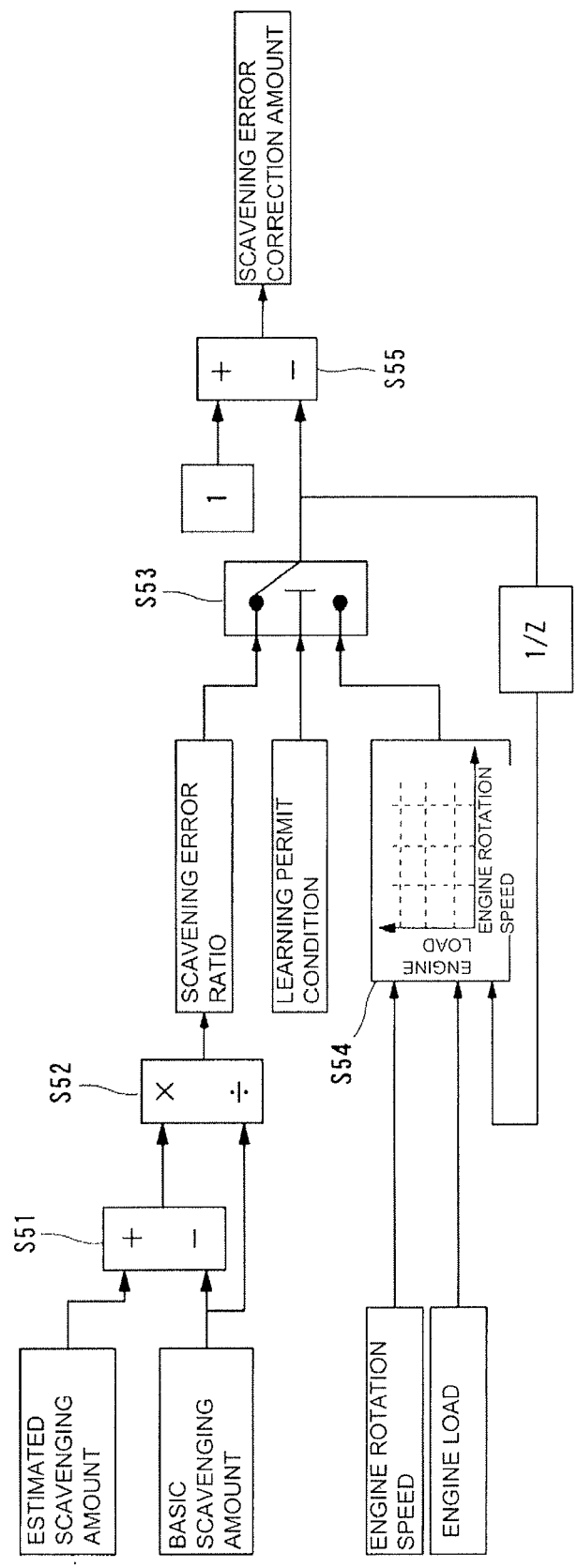
FIG. 7 is a block diagram showing an arithmetic operation for determination of compensation for or adjustment of a scavenging error.

FIG. 7 is a block diagram showing an arithmetic operation for compensation for or adjustment of a scavenging error which is used to correct a prescribed control amount affected by the fresh air blowby amount.

In block S51, a difference between the estimated scavenging amount and the basic scavenging amount is calculated. In block S52, the calculated difference in block S51 between the estimated scavenging amount and the basic scavenging amount is divided by a target scavenging amount to calculate a scavenging error ratio.

Subsequently, in block S53, when a predetermined learning permit condition is satisfied, the scavenging error ratio calculated in block S52 is output to block S53. The learning permit condition is satisfied in the steady state. More specifically, the learning permit condition is met when the transform angle of the variable valve mechanism 6 converges to the target value and an intake air amount changes within a preset range.

In block S54, the scavenging error ratio output from block S53 is stored or memorized as a learned value. There may be various methods with which the scavenging error ratio is memorized as a learned value. One method may be storing the scavenging error value as such. Another method may store the scavenging error value for each operating condition. In block S54, the scavenging error ratios are stored as the learned values in a respective field or area of a two dimensional map based on engine rotation and engine load. The scavenging error ratio derived from block S53 may be stored at a pertinent field and made retrievable.

In block S55, a median value is set to a value of 1, and the difference between the median value and a learned value (scavenging error ratio) retrieved by identifying engine speed and engine load in block S54 is calculated to obtain a scavenging error correction amount.

The scavenging error correction amount obtained at S55 may be effectively used for correcting a target fuel injection amount employed during a fresh air blowby from the intake passage 7 into the exhaust passage 10, which is calculated based on the basic scavenging amount. Put another way, by determining the deviation of the estimated scavenging amount from the basic scavenging amount, a deviation between the estimated scavenging amount and the basic scavenging amount is stored as a learned value for correction of a predetermined control value of the engine 1 for future similar operation. Thus, an adverse influence on the engine 1 may be prevented based on previous operating experience.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A control system for a direct-injection four-stroke internal combustion engine having at least one cylinder, an intake passage supplying air to the cylinder, and an exhaust passage removing exhaust gas from the cylinder, the control system comprising:
   a mass air flow meter configured to detect a mass air flow upstream of the cylinder;
   a control unit configured to:
      detect an intake air density in the cylinder;
      calculate an in-cylinder trapped intake air amount based on a cylinder volume and the detected intake air density; and
      estimate a difference between the intake air amount detected by the mass air flow meter and the in-cylinder trapped intake air amount, the estimated difference being an estimated scavenging amount representing a fresh air blowby amount passing from the intake passage into the exhaust passage.

2. The control system of claim 1, the control unit being further configured to calculate an in-cylinder effective volume into which an air will be introduced for contributing to combustion within the cylinder, wherein the cylinder volume is represented by the in-cylinder effective volume calculated by the control unit.

3. The control system of claim 1, the control unit being further configured to:
   calculate a basic scavenging amount based on a relationship between a valve overlap period during which both an intake valve and an exhaust valve are open and an intake air pressure in the intake manifold;
   determine an abnormality of the basic scavenging amount when the estimated scavenging amount continuously deviates from the basic scavenging amount by more than a predetermined value; and
   correct a fuel injection amount as a function of the amount of fresh air blowby passing from the intake passage into the exhaust passage.

4. The control system of claim 3, further comprising:
   a variable valve mechanism for controlling a valve timing of at least one of the intake and exhaust valves;
   the control unit being further configured to control the variable valve mechanism such that the valve overlap period does not extend beyond a predetermined period, when the estimated scavenging amount continuously deviates from the basic scavenging amount by more than a predetermined value.

5. The control system of claim 3, the control unit being further configured to correct the air-fuel ratio of the engine in a lean direction when the estimated scavenging amount is larger than the basic scavenging amount by more than a predetermined value.

6. The control system of claim 4, the control unit being further configured to:
   learn the deviation of the estimated scavenging amount from the basic scavenging amount as a learned value in association with the then prevailing operating condition, when a predetermined learning permit condition is satisfied; and
   correct the fuel injection amount based on the learned value.

7. The control system of claim 3, wherein the both an intake port and an exhaust port of the cylinder are disposed in a cylinder head.

8. A method for controlling a direct-injection four-stroke internal combustion engine having at least one cylinder, an intake passage supplying air to the cylinder, and an exhaust passage removing exhaust gas from the cylinder, the method comprising:
   detecting a mass air flow upstream of the cylinder;
   detecting an intake air density in the cylinder;
   calculating an in-cylinder trapped intake air amount based on a cylinder volume and the detected intake air density; and
   estimating a difference between the intake air amount detected by the mass air flow meter and the in-cylinder trapped intake air amount, the estimated difference being an estimated scavenging amount representing a fresh air blowby amount passing from the intake passage into the exhaust passage.

9. The method of claim 8, further comprising calculating an in-cylinder effective volume into which an air will be introduced for contributing to combustion within the cylinder, wherein the cylinder volume is represented by the in-cylinder effective volume calculated by the control unit.

10. The method of claim 8, further comprising:
    calculating a basic scavenging amount based on a relationship between a valve overlap period during which both an intake valve and an exhaust valve are open and an intake air pressure in the intake manifold;
    determining an abnormality of the basic scavenging amount when the estimated scavenging amount continuously deviates from the basic scavenging amount by more than a predetermined value; and
    correcting a fuel injection amount as a function of the amount of fresh air blowby passing from the intake passage into the exhaust passage.

11. The method of claim 10, wherein the engine further includes a variable valve mechanism for controlling a valve timing of at least one of the intake and exhaust valves, the method further comprising:
    controlling the variable valve mechanism such that the valve overlap period does not extend beyond a predetermined period, when the estimated scavenging amount continuously deviates from the basic scavenging amount by more than a predetermined value.

12. The method of claim 10, further comprising correcting the air-fuel ratio of the engine in a lean direction when the estimated scavenging amount is larger than the basic scavenging amount by more than a predetermined value.

13. The method of claim 11, further comprising:
    learning the deviation of the estimated scavenging amount from the basic scavenging amount as a learned value in association with the then prevailing operating condition, when a predetermined learning permit condition is satisfied; and
    correcting the fuel injection amount based on the learned value.

14. The method of claim 10, wherein the both an intake port and an exhaust port of the cylinder are disposed in a cylinder head.

15. A control system for an internal combustion engine, comprising:
    an in-cylinder intake air density detecting means configured to detect an intake air density in a cylinder;

an in-cylinder intake air trapped amount calculating means configured to calculate an in-cylinder trapped intake air amount based on a cylinder volume and the intake air density;
a mass air flow meter configured to detect a mass air flow upstream of the cylinder; and
an estimated scavenging amount calculating means configured to estimate a difference between the intake air amount detected by the mass air flow sensor and the in-cylinder trapped intake air amount as an estimated scavenging amount representing a fresh air blowby amount passing from an intake passage into an exhaust passage.

* * * * *